United States Patent [19]
Hu

[11] Patent Number: 6,120,054
[45] Date of Patent: Sep. 19, 2000

[54] DEVICE FOR THE ARMREST OF A BABY STROLLER

[76] Inventor: Stephen Hu, No 2, Ta-Tung Road, Hsin-Chu Industrial Park, Taiwan

[21] Appl. No.: 09/222,016

[22] Filed: Dec. 30, 1998

[51] Int. Cl.[7] .................................................. B62B 7/06
[52] U.S. Cl. .................... 280/650; 280/642; 297/411.26; 403/101
[58] Field of Search .................................. 280/642, 647, 280/650, 658, 47.4, 62; 403/83, 101, 330; 297/411.2, 411.26, 411.29

[56] References Cited

U.S. PATENT DOCUMENTS

| | | | |
|---|---|---|---|
| 5,104,180 | 4/1992 | Takahashi et al. | 280/642 X |
| 5,244,228 | 9/1993 | Chiu | 280/642 |
| 5,447,323 | 9/1995 | Huang | 280/642 |
| 5,460,398 | 10/1995 | Huang | 280/642 |
| 5,535,483 | 7/1996 | Cabagnero | 280/642 X |
| 5,865,460 | 2/1999 | Huang | 280/642 |

*Primary Examiner*—Michael Mar
*Attorney, Agent, or Firm*—Pro-Techtor International Services

[57] ABSTRACT

A fixing device for the armrest of a baby stroller including a fixing seat secured with one end thereof to the armrest and provided therein with a receiving space; an engaging device placed in the receiving space and comprised of an engaging unit and a push button. Wherein, the engaging unit is received through a connecting seat in the fixing seat, an end thereof protrudes out of an open end of the fixing seat; the bottom of the engaging unit is provided with a restorable spring. The push button is provided on the engaging unit and is placed in a slot of the fixing seat. The push button is suitably movable up and down in the slot for suitable pivotal action the engaging unit so that the engaging unit can be engaged in the engaging groove provided in the folding joint unit of the baby stroller. The armrest of the baby stroller thus can be assembled and detached in a convenient way, and can be effectively secured.

2 Claims, 4 Drawing Sheets

DEVICE FOR THE ARMREST OF A BABY STROLLER

BACKGROUND OF THE INVENTION

1. Field of the Invention

The present invention is related to a fixing device for the armrest of a baby stroller. And especially to such a fixing device which can render the armrest of the baby stroller to be more conveniently assembled and disassembled and more firmly fixed on the baby stroller. So that when a baby sits on the baby stroller, her arms can hold the armrest to make it safer in using the baby stroller.

2. Description of the Prior Art

Conventional baby strollers normally are provided with seat belts to guarantee safety of babies. However, armrests can be provided on baby strollers to make using of them more convenient and safer, so that when babies sit therein, they can be held by the babies. This can increase practicality, and the babies sitting thereon are protected from dropping consumers like such a design very much.

Nevertheless, the present method to mount an armrest on a baby stroller is not quite ideal as to convenience of operation, especially in the process of disassembling, and is comparatively not firm structurally.

SUMMARY OF THE INVENTION

In view of this, the inventor of the present invention provides a fixing device for the armrest of a baby. The device is very convenient in assembling and disassembling the armrest on and from the baby stroller, and the baby stroller is firmer after assembling. The defect inherent the conventional baby strollers thus is eliminated.

The primary object of the present invention is to provide a fixing device for the armrest of a baby stroller, the device is very convenient in assembling and disassembling, and therefore is more practical.

Another object of the present invention is to provide a fixing device for the armrest of a baby stroller, wherein a pushbutton is provided at an end of the armrest for pushing down with a finger. When in operation, the armrest can be held directly with a hand for detachment.

To achieve the above objects, the fixing device for the armrest of the baby stroller of the present invention is characterized in comprising a fixing seat fixed on one end of the armrest, an engagement device provided in the fixing device and including an engaging unit and a push button. The engaging unit is received through a connecting seat in the fixing seat, while an end thereof protrudes out of the fixing seat. The bottom of the engaging unit is provided with a restorable spring. The push button is provided on the engaging unit and can be moved to lower the engaging unit for suitable pivoting action, in order to engage the engaging unit in an engaging groove provided in a folding joint unit of the baby stroller. Therefore, convenient assembling and detachment of the armrest can be obtained.

The present invention will be apparent in the technique thereof after reading the detailed description of the preferred embodiment of the present invention in reference to the accompanying drawings.

BRIEF DESCRIPTION OF EWE DRAWINGS

DETAILED DESCRIPTION OF THE PREFERRED EMBODIMENT

Figure 1:
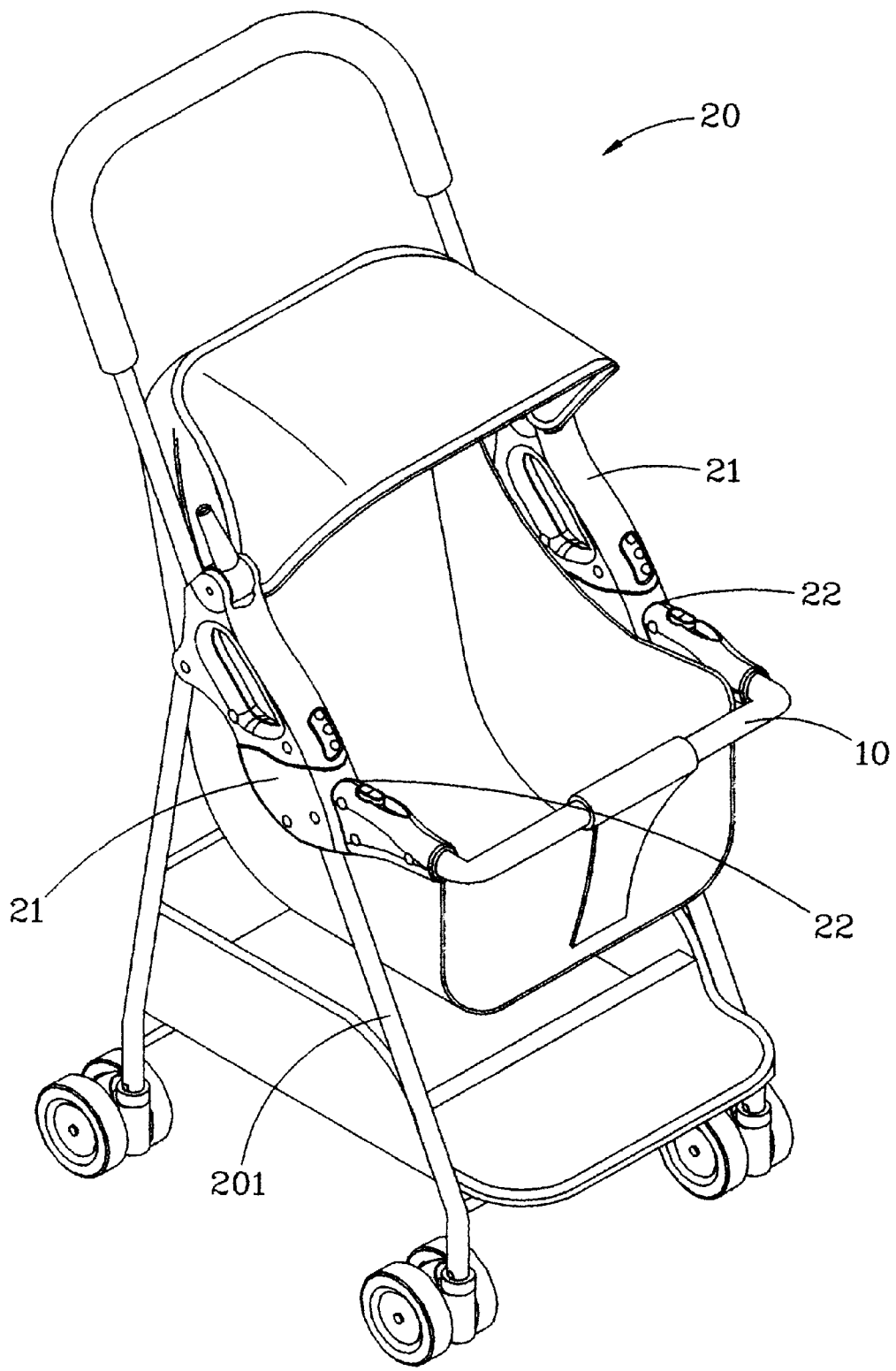
FIG. 1 is a perspective view showing an embodiment of a fixing device for an armrest of the present invention.

Referring firstly to FIG. 1 of the drawings, the fixing device for the armrest 10 of the baby stroller 20 of the present invention is provided on one end of the armrest 10. The device is used for effective engaging and fixing of the armrest 10 onto an engaging groove 22 provided in a folding joint unit 21 of the baby stroller 20.

Figure 2:
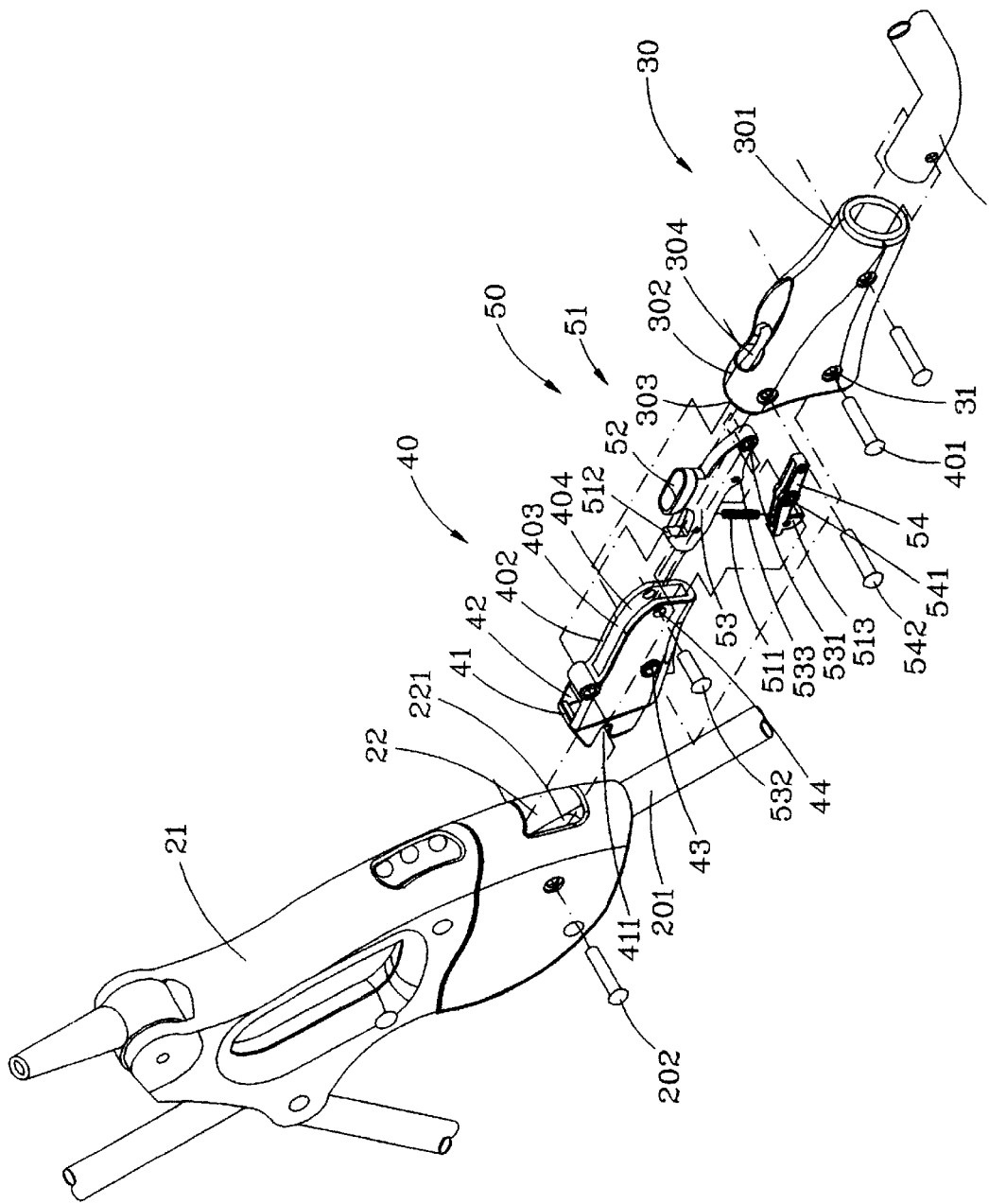
FIG. 2 is an analytic perspective view of the fixing device for the armrest of the present invention.

Referring to FIG. 2 which is an analytic perspective view of the fixing device for the armrest of the present invention, the fixing device is comprised of a fixing seat 30, a connecting seat 40 and an engaging device 50.

The fixing seat 30 is secured with one end 301 thereof to the armrest 10 of the baby stroller 20 and is provided therein with a receiving space. An open end 303 is formed thereon in opposition to the end secured to the armrest 10. The fixing seat 30 is provided therein with a slot 304 communicating with the receiving space.

The connecting seat 40 is placed in the fixing seat 30 through the open end 303, and is fixed on the fixing seat 30 with a plurality of rivets 401. The upper end 402 of the connecting seat 40 is provided with an opening 403 which communicates with the interior of a receiving chamber 404 thereof. One end 41 of the connecting seat 40 has a recess 411 and extends to expose to the outside of the fixing seat 30. The end 41 can be extended into an mouth 221 of the engaging groove 22 provided in the folding joint unit 21 of the baby stroller 20 and a mouth (not shown) on a front strut 201 of the baby stroller 20. Then the recess 411 can engage a rivet 202 on the front strut 201.

The engaging device 50 is placed in the receiving chamber 404 through the opening 403 of the connecting seat 40 and located in the receiving space of the fixing seat 30. The engaging device 50 is comprised of an engaging unit 51 and a push button 52. One end of the engaging unit 51 protrudes out of the open end 303 of the fixing seat 30. The bottom of the engaging unit 51 is provided with a restorable spring 511, while the front end of the engaging unit 51 is a protrusion 512 protrudes upwardly to expose to the outside of a through hole 42 provided on the connecting seat 40. The push button 52 is provided on the engaging unit 51 and is placed in the slot 304 of the fixing seat 30. The push button 52 is suitably movable up and down in the slot 304 for lowering the engaging unit 51 for suitable pivoting action so that the engaging unit 51 can be engaged in the engaging groove 22 provided in the folding joint unit 21 of the baby stroller 20. The push button 52 and the engaging unit 51 of this embodiment of the present invention are integrally formed.

In this embodiment, the engaging unit 51 is comprised of an upper engaging block 53 and a lower engaging block 54. One end 531 of the upper engaging block 53 is pivotally connected to the connecting seat 40 with a plurality of rivets 532, while the other end is the protrusion 512. The push button 52 is located at the approximate medium position of the upper engaging block 53. The lower engaging block 54 is provided beneath the upper engaging block 53, a middle area 541 thereof is pivotally connected to the connecting seat 40. The lower engaging block 54 is provided further with a protrusion 513 corresponding with the protrusion 512 provided on the upper engaging block 53. The restorable spring 511 is provided beneath the upper engaging block 53. When the push button 52 is pushed down, the upper engaging block 53 will push the protrusion 513 provided on the lower engaging block 54 to create an action like a seesaw. Thereby the protrusions 512, 513 of the upper engaging block 53 and the lower engaging block 54 respectively move in contrary directions and engage in the engaging groove 22 of the baby stroller 20.

Figure 3:
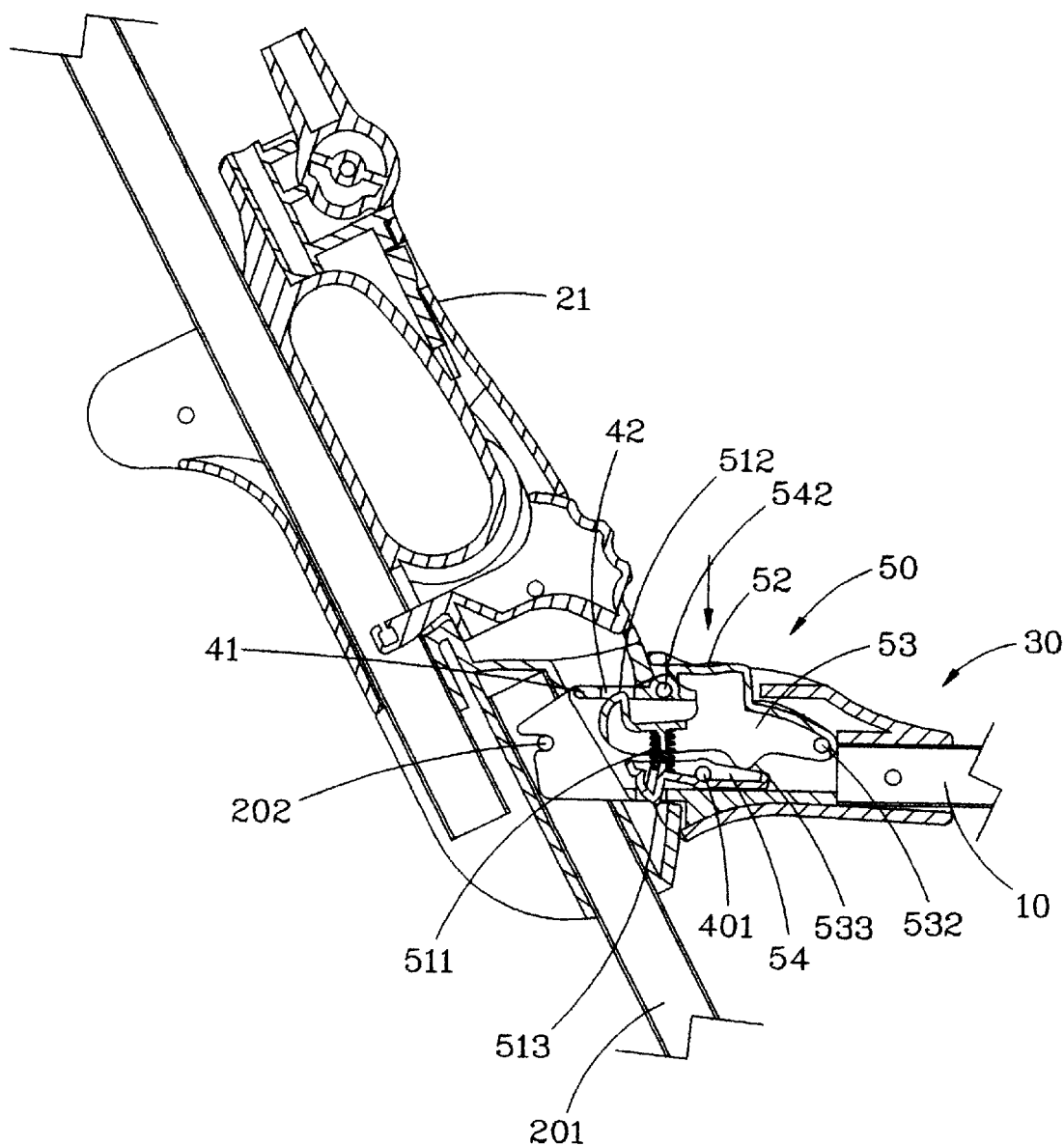
FIG. 3 is a sectional view showing assembling of the fixing device for the armrest of the present invention.

Referring to FIG. 3, which is a sectional view showing assembly of the fixing device for the armrest of the present invention, wherein the lower engaging block 54 of the engaging device 50 is placed in the receiving chamber 404, and the middle area 541 thereof is pivotally connected to two pivot holes 43, 31 of the fixing seat 30 and the connecting seat 40 is secured by the rivets 401. The restorable spring 511 is provided on the lower engaging block 54, while the upper engaging block 53 is placed on the lower engaging block 54, the upper engaging block 53 is pivotally connected to a pivot hole 44 on the connecting seat 40. The bottom 533 of the upper engaging block 53 slightly abuts the top of the lower engaging block 54. In this way, when the push button 52 of the engaging, device 50 is pressed down, the protrusion 512 provided on the upper engaging block 53 is moved downwardly to push the lower engaging block 54 to make a seesaw motion, so that the protrusion 513 provided on the lower engaging block 54 is moved upwardly and inwardly.

Figure 4:
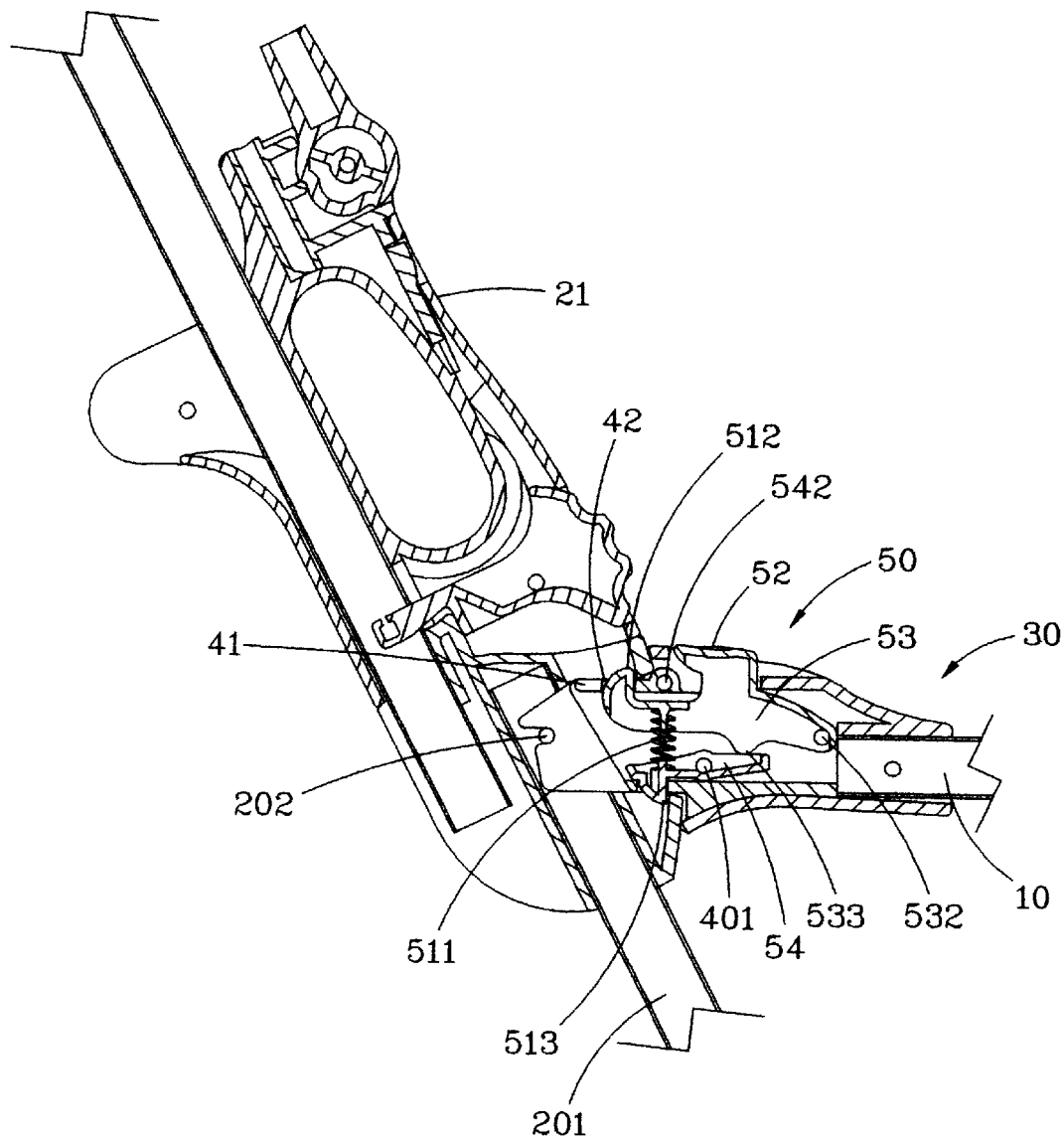
FIG. 4 is a schematic analytic perspective view showing mounting of the armrest to the fixing device of the present invention.

Referring to FIG. 4, when the armrest 10 is mounted on the folding joint unit 21 of the baby stroller 20, the push button 52 of the fixing device for the armrest 10 is pressed down. This renders the upper engaging block 53 and the lower engaging block 54 of the engaging device 50 to get close to each other. The end 41 on the connecting seat 40 can thus be placed in the engaging groove 22 provided in the folding joint unit 21. When the push button 52 is released, the protrusions 512 and 513 provided respectively on the upper engaging block 53 and the lower engaging block 54 hook the upper and the lower wall portions of the folding joint unit 21 at the engaging groove 22 through two gaps existing between each of the engaging blocks and the fixing seat 30. Therefore, the armrest 10 can be effectively fixed on the baby stroller 20.

Two fixing devices for the armrest of the baby stroller of the present invention can be provided on both ends of the armrest which is engaged directly onto the baby stroller through pressing of two push buttons respectively. By the above stated structural combination, such operation is very convenient, and the armrest can be firmly combined with the baby stroller. Therefore, when in use, a baby not only can hold the armrest, but also can be effectively protected from dropping. The whole structure of the present invention is novel, and is more practical than a conventional fixing device. The present invention is therefore industrial valuable and is improved and novel. The above disclosure is not intended as limiting. Those skilled in the art will readily observe that numerous modifications and alterations of the device may be made while retaining the teachings of the present invention.

What is claimed is:

1. A fixing device for an armrest of a baby stroller comprised of:

a fixing seat secured to said armrest of said baby stroller, a first end of said fixing seat includes a receiving space, a second end of said fixing seat includes an opening therein, and said fixing seat includes a slot that is in communication with said receiving space;

an engaging device that is positioned in said receiving space of said fixing seat, said engaging device comprises an engaging unit and a push button, a first end of said engaging unit is pivotally connected to a connecting seat, a second end of said engaging unit protrudes out of said opening of said second end of said fixing seat, said push button is placed in said slot of said fixing seat, said push button is moved up and down in said slot of said fixing seat;

said engaging unit further comprises an upper engaging block and a lower engaging block, a first end of said upper engaging block is pivotally connected to said connecting seat, and a second end of said upper engaging block includes a first engaging protrusion, said lower engaging block is located beneath said upper engaging block, said lower engaging block is pivotally connected to said connecting seat, said lower engaging block is provided with a second engaging protrusion, a restorable spring is positioned between said first and said second engaging protrusions, and a pushing protrusion on an underside of said upper engaging block contacts a top surface of said first end of said lower engaging block; such that when said engaging device is inserted into a folding joint unit of said baby stroller, said first and said second engaging protrusions are compressed by wall portions of a mouth of an engaging groove provided in said folding joint unit of said baby stroller, said spring urging said first and said second engaging protrusions outward after they pass said wall portions of said mouth, said first and said second engaging protrusions thereby securing said joint unit in an open position, and when said push button is depressed, said pushing protrusion of said upper engaging block pushes said first end of said lower engaging block downward, so that said spring is compressed as said second end of said upper engaging block is moved by said push button toward said second end of said lower engaging block so that said first and said second engaging protrusions are released from said wall portions of said mouth of said engaging groove so that said folding joint unit can be collapsed, said spring restoring said first and said second engaging protrusions to engaging positions when pressure on said push button is released.

2. A fixing device for an armrest of a baby stroller as in claim 1, wherein, said push button and said engaging unit are integrally formed.

* * * * *